Dec. 2, 1924.
J. L. FAIRRIE
1,517,775
MANUFACTURE OF SUGAR PRODUCTS
Filed Jan. 12, 1924
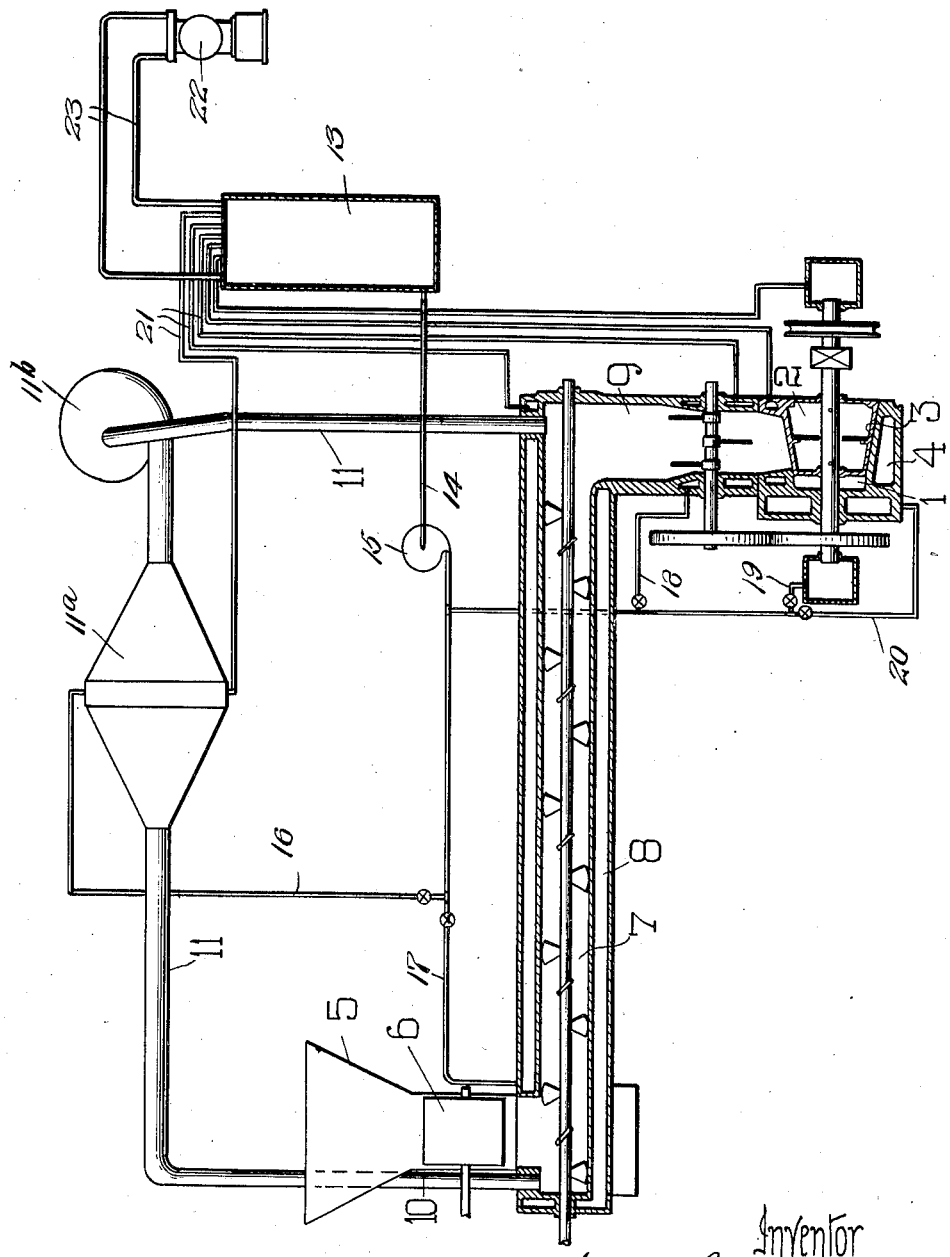

Patented Dec. 2, 1924.

1,517,775

UNITED STATES PATENT OFFICE.

JAMES LESLIE FAIRRIE, OF LIVERPOOL, ENGLAND.

MANUFACTURE OF SUGAR PRODUCTS.

Application filed January 12, 1924. Serial No. 685,905.

*To all whom it may concern:*

Be it known that I, JAMES LESLIE FAIRRIE, a subject of the King of Great Britain, residing in Liverpool, in the county of Lancaster and Kingdom of England, have invented a certain new and useful Manufacture of Sugar Products, of which the following is a specification.

This invention relates to the disintegration of crystalline material and especially to a new sugar product and the manufacture thereof.

One object of the invention is to provide an improved method of disintegrating crystalline material especially sugar but further objects are to manufacture new sugar products of specially light colour as compared with the normal colour of crude sugars containing the same amount of impurities, e. g. molasses. I find that I can disintegrate the crystalline material in a machine which is cooled well below ordinary atmospheric temperature (15° C.) and preferably below 0° C. I find that by such treatment I can obtain valuable products by grinding sugar to produce icing-sugar even from materials which are not necessarily the first crystals which separate from the syrup.

I have further found that if raw, or incompletely refined sugar is very finely divided, its appearance may be greatly improved without solution and re-crystallization or the like, and especially as regards lightening its colour and increasing its blending powers. Such a product is believed to be novel, as the particles are substantially free from the sticky cementitious matter which would be formed if an attempt were made to grind crude sugar without cooling.

The invention further includes the method of making the product by grinding or mechanically disintegrating such incompletely refined sugar at an artificially lowered temperature until it is transformed into a fine powder.

The accompanying drawing diagrammatically illustrates a suitable plant.

As one example of the invention, a conical grinding mill 1 (in which a serrated cone 2 engages within a conical grinding surface 3) may be artificially cooled to —8° C. or even lower by a cooling jacket 4 within which cold brine circulates. Brown sugar is fed from a hopper 5 through a seal valve 6 into a worm conveyor 7 which is also jacketed and cooled at 8. The sugar thus preliminarily cooled below atmospheric temperature is passed through a cooled chute 9 into the cooled mill where it is disintegrated at a temperature below 0° C. in this specific example. Air is excluded sufficiently to prevent deposition of moisture on the cooled sugar. It is preferable to interpose a pipe element 10 of thermally non-conducting material between the first hopper and the conveyor to prevent the clogging of the seal valve with cooled sugar and economize in cooling liquid.

In some cases I may further cool the sugar by circulating cooled air in a closed circuit 11 (including air-cooling chamber 11$^a$ and circulating fan 11$^b$) through the disintegrator and conveyor. Also I may provide cooling channels within the blades, grinding elements or the like of the disintegrator. Cooling brine may be drawn from brine tank 13 through pipe 14 by pump 15, and distributed thence through suitably valved piping 16, 17, 18, 19 and 20 to the cooling jackets of the various parts of the apparatus system, the return pipes leading from the jackets back to the brine tank being indicated generally at 21. A compressor for the refrigerant is indicated conventionally at 22, connected by pipes 23 to the usual expansion coils (not shown) in brine tank 13. The disintegrated material may be further bleached by a suitable gas, e. g. chlorine.

The cooling may be effected by any suitable cooling medium.

Disintegration by impact or other means of pulverization may be used in place of grinding. The resultant sugar can be separated into different grades of fineness by known means. A much lighter product is obtained which is not sticky and is in a very fine state of division. As employed herein, the terms brown sugar, crude sugar refer to sugar in which the crystals are enveloped by such a quantity of the syrup in which they were boiled that the natural white color of the sugar crystals is thereby impaired.

It has been proposed to employ cooling jackets in disintegrators to remove the heat liberated, but I cool the machine much more intensely with the novel object specified.

By the term "cooling" I refer to commercially practicable degrees of cooling and I do not include cooling to the temperature of liquid air. By the term "artificial cooling," I refer to cooling well below 15° C. which is obtainable by the use of cooling fluids such as brine as distinguished from (natural) cold water.

I declare that what I claim is:—

1. The process of reducing sugar crystals to a fine powder which comprises mechanically disintegrating the sugar at a temperature below 0° C.

2. The process of improving the appearance of crude sugar crystals which comprises mechanically disintegrating the artificially cooled dry crystals to a fine powder, the crystals being cooled well below 15° C.

3. The process of producing powdered sugar which comprises subjecting dry sugar crystals to a preliminary cooling to a temperature well below 15° C. and then disintegrating the cooled material in a cooled disintegrator at a temperature below 0° C.

4. The process of producing powdered sugar which comprises preliminarily cooling sugar crystals below ordinary atmospheric temperature, mechanically disintegrating them to powder in a cooled disintegrator and circulating a current of cooled air through the disintegrator and the preliminary cooling zone.

5. As a new article of manufacture a prepared sugar comprising essentially a crude sugar reduced to a fine non-sticky powder, said prepared sugar being unbleached and containing substantially all the characteristic impurities of said crude sugar chemically unchanged but being much lighter in color and its particles being much smaller than the original crude sugar crystals.

In witness whereof, I have hereunto signed my name this 21st day of Dec., 1923, in the presence of two subscribing witnesses.

JAMES LESLIE FAIRRIE.

Witnesses:
HENRY J. GREGORY,
ED. J. McDEVITT.